United States Patent
Vijn et al.

(10) Patent No.: US 6,953,090 B2
(45) Date of Patent: Oct. 11, 2005

(54) CEMENTING SUBTERRANEAN ZONES USING CEMENT COMPOSITIONS CONTAINING BIODEGRADABLE DISPERSANTS

(75) Inventors: Jan Pieter Vijn, Leiderdorp (NL); Christian E. Spindler, Wasserburg am Inn (DE); Gregor Keilhofer, Tacherting (DE); Johann Plank, Trostberg (DE)

(73) Assignees: Halliburton Energy Services, Inc., Duncan, OK (US); Degussa Construction Polymers GmbH, Trostberg (DE)

( * ) Notice: Subject to any disclaimer, the term of this patent is extended or adjusted under 35 U.S.C. 154(b) by 0 days.

(21) Appl. No.: 10/715,009

(22) Filed: Nov. 17, 2003

(65) Prior Publication Data

US 2004/0099416 A1 May 27, 2004

Related U.S. Application Data

(63) Continuation of application No. 10/170,339, filed on Jun. 13, 2002.

(51) Int. Cl.$^7$ .......................... E21B 33/13; C04B 24/12
(52) U.S. Cl. ....................... 166/292; 166/293; 166/294; 106/727; 106/728; 106/802; 106/808; 106/810; 106/823
(58) Field of Search ................................ 166/292, 293, 166/294, 295, 285; 106/727, 728, 802, 808, 810, 823

(56) References Cited

U.S. PATENT DOCUMENTS

| | | | |
|---|---|---|---|
| 3,359,225 A | 12/1967 | Welsend | |
| 3,937,282 A | 2/1976 | Shryock et al. | |
| 4,028,125 A | 6/1977 | Martin | |
| 4,557,763 A | 12/1985 | George et al. | |
| 4,676,832 A | 6/1987 | Childs et al. | |
| 5,158,996 A | 10/1992 | Valenti | |
| 5,284,512 A | 2/1994 | Koskan et al. | |
| 5,340,860 A | 8/1994 | Brake et al. | |
| 5,369,198 A | 11/1994 | Albrecht et al. | |
| 5,610,264 A | 3/1997 | Wood et al. | |
| 5,614,017 A | 3/1997 | Shawl | |
| 5,660,626 A | 8/1997 | Ohta et al. | |
| 5,670,578 A | 9/1997 | Shawl | |
| 5,688,904 A | 11/1997 | Wood et al. | |
| 5,798,425 A | 8/1998 | Albrecht et al. | |
| 5,876,623 A | 3/1999 | Tang et al. | |
| 5,908,885 A | 6/1999 | Sikes et al. | |
| 6,133,347 A | 10/2000 | Vickers, Jr. et al. | |
| 6,136,950 A | 10/2000 | Vickers, Jr. et al. | |
| 6,174,980 B1 | 1/2001 | Hirata et al. | |
| 6,182,758 B1 | 2/2001 | Vijn | |
| 6,211,317 B1 | 4/2001 | Albrecht et al. | |
| 6,284,867 B1 | 9/2001 | Vickers, Jr. et al. | |
| 6,405,801 B1 * | 6/2002 | Vijn et al. | 166/293 |
| 6,429,266 B2 | 8/2002 | Vickers, Jr. et al. | |
| 6,454,004 B2 * | 9/2002 | Reddy et al. | 166/293 |
| 6,565,645 B1 * | 5/2003 | Klein et al. | 106/778 |
| 2002/0005287 A1 | 1/2002 | Reddy et al. | |

FOREIGN PATENT DOCUMENTS

| | | |
|---|---|---|
| EP | 0 767 807 B1 | 1/1996 |
| EP | 1 238 952 A1 | 9/2002 |
| GB | 2 307 689 | 6/1997 |
| JP | 7172888 | 7/1995 |
| WO | WO 96/00743 | 1/1996 |

OTHER PUBLICATIONS

Donlar Corporation Technical Bulletin entitled Higher Molecular Weight Polymers dated Apr. 24, 1998.
Donlar Corporation Technical Bulletin entitled Low Molecular Weight Polymers dated Apr. 24, 1998.
Database WPI; Section Ch, Week 199536; Derwent Publications Ltd., London, GB; AN 1995–272734; XP002254694 & JP 07 172888 A (Mitsui Toatsu Chem Inc.), Jul. 11, 1995 *abstract*.
Database WPI; Section CH, Week 199816; Derwent Publications Ltd., London, GB; AN 1998–174744; XP002254695 & JP 10 036156 A (Mitsui Toatsu Chem Inc.), Feb. 10, 1998 *abstract*.
Claudia Boeker: "Polyaspartic Acid Derivatives as Cement–Additives" Online!; May 2000, Technische Universitat Wien XP002254722; Retrieved from the Internet: <URL:http://www.arcs.ac.at/dissdb/rn036751>; retrieved on Sep. 17, 2002! *see abstract*.

* cited by examiner

*Primary Examiner*—David Bagnell
*Assistant Examiner*—K. Thompson
(74) *Attorney, Agent, or Firm*—Craig W. Roddy; McAfee & Taft P.C.

(57) ABSTRACT

Methods of cementing subterranean zones using cement compositions containing biogradable dispersants are provided. The methods are basically comprised of the steps of preparing a hydraulic cement, a biodegradable dispersant comprised of polyaspartic acid containing side chains formed by reacting one or more side chain chemicals with said polyaspartic acid and sufficient water to form a pumpable slurry, placing the cement composition into a zone to be cemented and allowing the cement composition to set into an impermeable solid mass therein.

19 Claims, No Drawings

CEMENTING SUBTERRANEAN ZONES USING CEMENT COMPOSITIONS CONTAINING BIODEGRADABLE DISPERSANTS

This application is a continuation of U.S. patent application Ser. No. 10/170,399, filed Jun. 13, 2002.

BACKGROUND OF THE INVENTION

1. Field of the Invention

The present invention relates to methods of cementing subterranean zones using cement compositions containing biodegradable dispersants.

2. Description of the Prior Art

In the cementing of oil and gas wells and the like, dispersants are extensively used to reduce the rheologies of cement compositions, i.e., the apparent viscosities and other properties of the cement compositions, as well as to reduce the water content of the cement compositions. The reduction of the rheology of a cement composition allows the cement composition to be pumped with less friction pressure which utilizes less pump horsepower. In addition, the lower rheology often allows the cement composition to be pumped in turbulent flow. Turbulent flow characteristics are desirable when pumping cement compositions in oil and gas wells to more efficiently remove drilling fluid from surfaces in the well bore as the drilling fluid is displaced by the cement composition being pumped. The inclusion of dispersants in cement compositions is also desirable in that the presence of the dispersants reduces the water required for preparation of the cement compositions. Cement compositions having reduced water content are characterized by improved compressive strength development.

A number of dispersing agents have been utilized heretofore in cement compositions, particularly in cement compositions used for primary and remedial cementing in oil and gas wells. For example, certain organic acids such as gluconic acid and citric acid have been recognized by those skilled in the art as cement dispersants. However, such organic acids are also strong cement composition set retarding agents which is often undesirable. That is, the presence of an organic acid dispersant in a cement composition prevents the cement composition from setting for a relatively long period of time which is often costly or otherwise detrimental. Other dispersants which are commonly used in hydraulic cement compositions include polynapthylene sulfonate which is commercially available under the trade designation "CFR-2™" from Halliburton Energy Services of Duncan, Okla., the condensation product of formaldehyde, acetone and a sulfite which is commercially available under the trade designation "CFR-3™" from Halliburton Energy Services, poly-B-naphthol sulfonate, polymelamine sulfonate and many others. Another highly efficient dispersant for use in cement compositions is disclosed in U.S. Pat. No. 6,136,950 issued to Vickers, Jr. et al. on Oct. 24, 2000 which is incorporated herein by reference. The dispersant is a polycarboxylate polymer comprised of a functionalized polyamide main chain polymer onto which are grafted at least some oligomeric or polymeric hydrophilic side chains. Commercially available dispersants are generally not environmentally acceptable, especially in offshore operations, in that they do not undergo complete biodegradation in the environment and can cause damage to aquatic and other life therein.

Thus, there are needs for improved methods of cementing subterranean zones penetrated by well bores using cement compositions containing biodegradable dispersants.

SUMMARY OF THE INVENTION

The present invention provides methods of using improved cement compositions containing biodegradable dispersants for cementing subterranean zones penetrated by well bores which meet the needs described above and overcome the deficiencies of the prior art. The cement compositions which are useful in accordance with the methods of this invention are basically comprised of a hydraulic cement, a biodegradable dispersant comprised of polyaspartic acid containing side chains formed by reacting one or more side chain forming chemicals with said polyaspartic acid and sufficient water to form a pumpable slurry. The side chain containing biodegradable dispersant is present in an amount sufficient to reduce the rheology and water content of the cement composition. Preferably, the side chain containing polyaspartic acid dispersant has a molecular weight in the range of from about 5,000 to about 500,000 daltons.

The methods of cementing a subterranean zone penetrated by a well bore of this invention are basically comprised of the following steps. A cement composition is prepared comprised of a hydraulic cement, a biodegradable dispersant comprised of the above described side chain containing polyaspartic acid present in an amount sufficient to reduce the rheology and water content of the cement composition and sufficient water to form a pumpable slurry. Thereafter, the cement composition is placed in the subterranean zone to be cemented and is allowed to set into an impermeable solid mass therein.

In addition to functioning as a cement composition rheology and water content reducing dispersant, the side chain containing polyaspartic acid also functions to enhance the effectiveness of a fluid loss control agent when such an agent is included in the cement composition. For example, a hydroxyethylcellulose or a polyethylene imine fluid loss control agent can be included in the cement composition and the side chain containing polyaspartic acid therein functions with the fluid loss control agent to reduce fluid loss to a substantially greater degree than when the side chain containing polyaspartic acid is not present.

Thus, it is a general object of the present invention to provide improved methods of cementing subterranean zones using cement compositions containing biodegradable dispersants.

Other and further objects, features and advantages of the present invention will be readily apparent to those skilled in the art upon a reading of the description of preferred embodiments which follows.

DESCRIPTION OF PREFERRED EMBODIMENTS

As mentioned, the improved methods of this invention utilize cement compositions basically comprised of a hydraulic cement, a biodegradable dispersant comprised of polyaspartic acid containing side chains present in an amount sufficient to reduce the rheology and water content of the cement composition and sufficient water to form a pumpable slurry.

The biodegradable side chain containing polyaspartic acid dispersant can be prepared by the condensation reaction of maleic acid and ammonia under heat. The polyaspartic acid formed is then reacted with a side chain forming chemical. The side chain forming chemical can be one or more of ethylene oxide, propylene oxide, a vinyl functional polyethylene glycol, a vinyl functional polypropylene glycol, an amino functional polyethylene glycol (the most preferred being those terminated by an NH₂ group), a polyester, a polyamide, polyethyleneoxide, polypropyleneoxide and the like. The molecular weight of the resulting side chain containing polyaspartic acid is increased to in the range of from about 5,000 to about 500,000 daltons. The formation of the side chains on the polyaspartic acid reduces the cement set retarding properties of the acid in addition to reducing the rheology and water content of cement compositions to which it is added. The side chain containing polyaspartic acid dispersant is included in a cement composition in a relatively small amount, i.e., an amount in the range of from about 0.10% to about 2.0% by weight of cement therein, preferably in an amount of about 0.20%.

A variety of hydraulic cements can be utilized in accordance with the present invention including those comprised of calcium, aluminum, silicon, oxygen and/or sulfur which set and harden by reaction with water. Such hydraulic cements include, but are not limited to, Portland cements, pozzolana cements, gypsum cements, high alumina content cements, silica cements and high alkalinity cements. Portland cements are generally preferred for use in accordance with the present invention, and Portland cements of the types defined and described in *API Specification For Materials And Testing For Well Cements*, API Specification 10, 5$^{th}$ Edition, dated Jul. 1, 1990 of the American Petroleum Institute and their equivalents are particularly preferred. API Portland cements including classes A, B, C, G and H can be utilized with API classes G and H being preferred and class H being the most preferred.

The water utilized in the cement compositions of this invention can be fresh water, unsaturated salt water and saturated salt water including brines or seawater. Generally, the water can be from any source provided it does not contain an excess of compounds that adversely affect other components in the cement compositions. The water is present in a cement composition of this invention in an amount sufficient to form a pumpable slurry. More particularly, the water is present in the cement compositions in an amount in the range of from about 18% to about 110% by weight of hydraulic cement therein, more preferably in an amount of from about 25% to about 56%.

As mentioned, the cement compositions of this invention can also include a fluid loss control additive which when utilized in combination with the biodegradable dispersant of this invention provides synergistically low fluid loss from the cement composition. Examples of fluid loss control agents which can be utilized in combination with the biodegradable dispersants of this invention, include, but are not limited to, hydroxyethylcellulose, hydroxymethylcellulose, carboxymethylhydroxyethylcellulose, hydroxypropylcellulose, a copolymer of 2-acrylamido-2-methyl propane sulfonic acid and N,N-dimethylacrylamide, a graft lignin or lignite polymer, starch, guar gum, hydroxypropylguar, polyethyleneimine, polyvinylalcohol, polyvinylacetate, carragenan and xanthane. Of these, hydroxyethylcellulose is preferred. When used, the fluid loss control additive is included in a cement composition of this invention in an amount in the range of from about 0.2% to about 2.0% by weight of cement therein.

The biodegradable side chain containing polyaspartic acid dispersants of this invention can be effectively utilized in cement compositions which are subjected to temperatures in the range of from about 32° F. to about 500° F. The cement composition densities utilized can range from about 0.66 to about 2.50 kilograms per liter. As mentioned, the biodegradable side chain containing polyaspartic acid dispersants of this invention are biodegradable and nontoxic.

As will be understood by those skilled in the art, when the cement compositions of this invention are utilized for cementing subterranean zones penetrated by well bores, they can also include a variety of other conventional well cement additives. For example, the cement compositions can include weighting materials, set retarding additives, set accelerators, strength stabilizers, strength enhancers, lightweight additives, anti-gas migration additives, defoamers, foamers, expansion additives and the like.

The methods of the present invention for cementing a subterranean zone penetrated by a well bore basically comprise the following steps: (a) preparing a cement composition of this invention comprised of a hydraulic cement, a biodegradable dispersant comprised of side chain containing polyaspartic acid present in an amount sufficient to reduce the rheology and water content of the cement composition and sufficient water to form a pumpable slurry, (b) placing the cement composition in the zone to be cemented and (c) allowing the cement composition to set into an impermeable solid mass therein.

As mentioned above, the cement compositions of this invention containing the above described biodegradable dispersant have reduced rheology and reduced water content as compared to cement compositions which do not include the biodegradable dispersant. The lower rheology of the cement composition allows the cement composition to be pumped with less friction pressure utilizing less pump horsepower. The lower rheology also allows the cement composition to be pumped in turbulent flow which is highly advantageous in primary cementing operations. The reduced water content of the cement compositions of this invention substantially improves the compressive strengths of the cement compositions when set. As also mentioned above, the biodegradable dispersant utilized in the cement compositions of this invention synergistically function in combination with certain fluid loss control agents to reduce the fluid loss from the cement compositions to a substantially greater degree than cement compositions which include the fluid loss control agent but not the biodegradable dispersant.

In order to further illustrate the cement compositions and methods of the present invention, the following examples are given.

EXAMPLE 1

Test cement compositions were prepared containing fresh water, Dyckerhoff API Class G Portland cement and a biodegradable dispersant of this invention, i.e., an ethylene oxide side chain containing polyaspartic acid having a molecular weight of about 10,000 daltons. The thickening times of the test cement compositions at 125° F., the rheology of the cement compositions after preparation at room temperature, the rheology of the cement compositions after conditioning at 125° F., the free water of the cement compositions, the settling of the cement compositions and the compressive strengths of the cement compositions at 3,000 psi and 125° F. were determined. The quantities of the components in the test cement compositions and the test results are given in Table I below.

TABLE I

Effect Of Concentration On Rheology

| Test Cement Composition No. | 1 | 2 | 3 | 4 |
|---|---|---|---|---|
| Fresh Water, % by wt. of cement | 44 | 44 | 44 | 44 |
| Ethylene Oxide Side Chain Containing Polyaspartic Acid, % by wt. of cement | 0.1 | 0.2 | 0.3 | 0.4 |
| Class G Cement, kilograms | 100 | 100 | 100 | 100 |
| Cement Composition Density, kilograms/liter | 1.92 | 1.92 | 1.92 | 1.92 |
| Thickening Time at 125° F. | | | | |
| 30 Bc | 2:57 | 5:43 | — | — |
| 70 Bc | 3:30 | 6:09 | — | — |
| 100 Bc | 3:37 | 6:17 | — | — |
| Rheology After Preparation At Room Temperature | | | | |
| 300–200–100– | 25–17–9 | 29–18–9 | 25–16–18 | 23–15–8 |
| 60–30–6–3 rpm | 6–4–3–2 | 6–3.5–2–1.5 | 5–3–2–1 | 4–3–2–1 |
| Rheology After Conditioning At 125° F. | | | | |
| 300–200–100– | 30–22–13 | 21–13–7 | 12–8–4 | 12–8–4 |
| 60–30–6–3 rpm | 10–8–6–5 | 4–3–2–1.5 | 3–2–2–1 | 3–2–2–1 |
| Free Water, % by vol. | 9 | 16 | 44 | 38 |
| Settling, % by vol. | 0 | 4.8 | 56 | 62 |
| Universal Cement Analyzer Data | | | | |
| 50 psi, Hrs:Min | 7:44 | — | — | — |
| 500 psi, Hrs:Min | 9:15 | 10:02 | — | — |
| 24 Hrs, psi | 4161 | 2500 | set | set |
| 72 Hrs, psi | 5843 | 4141 | — | — |

As shown in Table I, the improved cement compositions of this invention containing a biodegradable dispersant comprised of ethylene oxide side chain containing polyaspartic acid have excellent properties. While the thickening times, the free water, settling and the set times increase with increased dispersant concentrations, at concentrations of the biodegradable dispersant below about 0.3% by weight of cement, the dispersant provides excellent cement composition properties.

EXAMPLE 2

Additional test cement compositions were prepared utilizing fresh water and Dyckerhoff API Class G Portland cement. Test Cement Composition No. 1 contained only fresh water, cement and hydroxyethylcellulose fluid loss control agent. Test Cement Composition No. 2 contained fresh water, cement, the dispersant of this invention and hydroxyethylcellulose fluid loss control agent. The rheologies after preparation at room temperature and after conditioning at 125° F. were determined as well as the fluid loss from the test cement compositions at 125° F. The quantities of the components and the results of the tests are given in Table II below.

TABLE II

Synergistic Effect With Fluid Loss Control Additives

| Test Cement Composition No. | #1 | #2 |
|---|---|---|
| Fresh Water, % by wt. of cement | 45 | 45 |
| Ethylene Oxide Side Chain Containing Polyaspartic Acid, % by wt. of cement | 0 | 0.2 |
| Hydroxyethylcellulose Fluid Loss Agent, % by wt. of cement | 0.75 | 0.75 |
| Class G Cement, kilograms | 100 | 100 |
| Cement Composition Density, kilograms/liter | 1.9 | 1.9 |
| Rheology After Preparation At Room Temperature | | |
| 300–200–100 | 128–89–48 | 136–90–44 |
| 60–30–6–3 | 30–17–5–3 | 25–12–2–1 |
| Rheology After Conditioning At 125° F. | | |
| 300–200–100 | 128–100–69 | 70–45–22 |
| 60–30–6–3 | 55–43–31–28 | 13–6–1–0 |
| API Fluid Loss At 125° F., ml/30 min | 245 | 60 |

As shown in Table II, the cement composition containing the dispersant of the present invention (Test Cement Composition No. 2) produced lower rheology and substantially less fluid loss than the cement composition without the dispersant (Test Cement Composition No. 1).

EXAMPLE 3

Additional test cement compositions were prepared comprised of water, Dyckerhoff Class G cement and the biodegradable dispersant of this invention. The test compositions included varying amounts of water, but the same amounts of cement and dispersant. The rheologies of the test cement compositions after preparation at room temperature and after conditioning at 125° F. were determined as well as the set times and compressive strengths of the cement compositions. The results of these tests are set forth in Table III below.

TABLE III

| Water Reducing Properties | | | | |
|---|---|---|---|---|
| Test Cement Composition No. | 1 | 2 | 3 | 4 |
| Fresh Water, % by wt. of cement | 44 | 35 | 30 | 25 |
| Ethylene Oxide Side Chain Containing Polyaspartic Acid, % by wt. of cement | 0.2 | 0.2 | 0.2 | 0.2 |
| Class G Cement, kilograms | 100 | 100 | 100 | 100 |
| Cement Composition Density, kilograms/liter | 1.92 | 2.03 | 2.11 | 2.21 |
| Rheology After Preparation At Room Temperature | | | | |
| 300–200–100– | | 29–18–9 | 67–41–18 | 163–95–36 | 300+–243–94 |
| 60–30–6–3 | | 6–3.5–2–1.5 | 10–5–3–2 | 17–6–1–0 | 45–15–1.5–0 |
| Rheology After Conditioning At 125° F. | | | | |
| 300–200–100– | | 21–13–7 | 38–21–8 | 119–70–30 | 300+–211–94 |
| 60–30–6–3 | | 4–3–2–1.5 | 4–2–1–0 | 16–7–1–0 | 47–24–3–2 |
| Universal Cement Analyzer Data | | | | |
| 50 psi, Hrs:Min | — | 5:36 | 4:39 | 4:32 |
| 500 psi, Hrs:Min | 10:02 | 6:38 | 5:26 | 5:08 |
| 24 Hrs, psi | 2500 | 6000 | 6547 | 9000 |
| 72 Hrs, psi | 4141 | 7531 | — | 10529 |

From Table III it can be seen that the biodegradable dispersant of this invention reduces the water content required while maintaining pumpability. In addition, the set cement compositions have excellent compressive strengths.

EXAMPLE 4

Three additional cement compositions of this invention were prepared comprised of salt water containing various concentrations of salt, the biodegradable dispersant of this invention and Dyckerhoff Class G cement. The rheologies of the test compositions after perparation at room temperature and after conditioning at 125° F. were determined as well as the set times and compressive strengths of the cement compositions. The results of these tests are set forth in Table IV below.

TABLE IV

| Salt Tolerance | | | |
|---|---|---|---|
| Test Cement Composition No. | 1 | 2 | 3 |
| Fresh Water, % by wt. of cement | 44 | 44 | 44 |
| Ethylene Oxide Side Chain Containing Polyaspartic Acid, % by wt. of cement | 0.2 | 0.2 | 0.2 |
| Salt (NaCl), % by weight of water | 10 | 18 | 37 |
| Class G Cement, kilograms | 100 | 100 | 100 |
| Cement Composition Density, kilograms/liter | 1.93 | 1.95 | 1.96 |
| Rheology After Preparation At Room Temperature | | | |
| 300–200–100– | 23–14–6 | 22–14–7 | 27–18–10 |
| 60–30–6–3 rpm | 3–1–0–0 | 3–1–0–0 | 6–3–2–1 |
| Rheology After Conditioning At 125° F. | | | |
| 300–200–100– | 18–13–6 | 11–7–4 | 20–15–9 |
| 60–30–6–3 rpm | 3–2–0–0 | 2–1.5–0–0 | 7–5–3–2 |
| Universal Cement Analyzer Data | | | |
| 50 psi, Hrs:Min | 8:05 | 11:47 | 47:45 |
| 500 psi, Hrs:Min | 9:43 | 13:31 | 51:15 |
| 24 Hrs, psi | 2400 | 3800 | — |
| 72 Hrs, psi | 3344 | 5107 | 3047 |

From Table IV it can be seen that the biodegradable dispersant of this invention is salt tolerant and that the rheologies of the test cement compositions were low even when the salt water was saturated at 37% salt by weight of water. While the set times are somewhat longer, the compressive strengths are excellent.

Thus, the improved methods of this invention are well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of cementing a subterranean zone penetrated by a well bore comprising the steps of:
   (a) preparing a cement composition comprising a hydraulic cement, a biodegradable dispersant comprised of polyaspartic acid containing side chains formed by reacting one or more side chain forming chemicals therewith and sufficient water to form a pumpable slurry;
   (b) placing said cement composition in said zone to be cemented; and
   (c) allowing said cement composition to set into an impermeable solid mass therein.

2. The method of claim 1 wherein said one or more side chain forming chemicals are selected from the group consisting of ethylene oxide, propylene oxide, a vinyl functional polyethylene glycol, a vinyl functional polypropylene glycol, an amino functional polyethylene glycol, a polyester, a polyamide, polyethylene oxide and polypropylene oxide.

3. The method of claim 1 wherein said side chain forming chemical is ethylene oxide.

4. The method of claim 1 wherein said side chain forming chemical is a vinyl functional polyethylene glycol.

5. The method of claim 1 wherein said side chain forming chemical is a vinyl functional polypropylene glycol.

6. The method of claim 1 wherein said side chain forming chemical is an amino functional polyethylene glycol.

7. The method of claim 1 wherein said side chain forming chemical is a polyester.

8. The method of claim 1 wherein said side chain forming chemical is a polyamide.

9. The method of claim 1 wherein said side chain forming chemical is polyethylene oxide.

10. The method of claim 1 wherein said dispersant has a molecular weight in the of from about 5,000 to about 500,000 Daltons.

11. The method of claim 1 wherein said dispersant has a molecular weight of about 10,000 Daltons.

12. The method of claim 1 wherein said dispersant is present in said composition in an amount in the range of from about 0.1% to about 2.0% by weight of cement therein.

13. The method of claim 1 wherein said hydraulic cement is selected from the group consisting of Portland cements, pozzolana cements, gypsum cements, alumina cements and silica cements.

14. The method of claim 1 wherein said hydraulic cement in said composition is Portland cement.

15. The method of claim 1 wherein said water in said composition is selected from the group consisting of fresh water, unsaturated salt water and saturated salt water.

16. The method of claim 1 wherein said water is present in said composition in an amount in the range of from about 18% to about 110% by weight of cement therein.

17. The method of claim 1 wherein said composition further comprises a fluid loss control agent selected from the group consisting of hydroxyethylcellulose, hydroxymethylcellulose, carboxymethylhydroxyethylcellulose, hydroxypropylcellulose, a copolymer of 2-acrylamido-2-methyl propane sulfonic acid and N,N-dimethylacrylamide, a graft lignin a lignite polymer, starch, guar, hydroxypropylguar, polyethyleneimine, polyvinylalcohol, polyvinylacetate, carragenan and xanthane.

18. The method of claim 17 wherein said fluid loss control agent in said composition is hydroxyethylcellulose.

19. The method of claim 17 wherein said fluid loss control agent is present in said composition in an amount in the range of from about 0.2% to about 2.0% by weight of cement therein.

* * * * *

UNITED STATES PATENT AND TRADEMARK OFFICE
CERTIFICATE OF CORRECTION

PATENT NO.       : 6,953,090 B2                                   Page 1 of 1
APPLICATION NO.  : 10/715009
DATED            : October 11, 2005
INVENTOR(S)      : Jan Pieter Vijn et al.

It is certified that error appears in the above-identified patent and that said Letters Patent is hereby corrected as shown below:

Title page,
Item [63], Related U.S. Application Data, delete "10/170,339" and substitute -- 10/170,399 --.
Item [56], References Cited, FOREIGN PATENT DOCUMENTS, insert
-- WO 00/00536    01/06/2000    Sikes et al.
   WO 00/09459    02/24/2000    Brown et al.
   WO 00/09460    02/24/2000    Bury et al.
   WO 00/59965    06/22/2000    Brauer et al.
   JP 6279082     10/04/1994    Fujio et al. --.

Column 7,
Line 34, delete "perparation" and insert -- preparation --.

Column 9,
Line 2, insert -- range -- between "the" and "of.".

Signed and Sealed this

Fourth Day of July, 2006

JON W. DUDAS
*Director of the United States Patent and Trademark Office*